United States Patent [19]
Wasserman et al.

[11] 3,839,297
[45] Oct. 1, 1974

[54] USE OF STANNOUS OCTOATE CATALYST IN THE MANUFACTURE OF L(-)LACTIDE-GLYCOLIDE COPOLYMER SUTURES

[75] Inventors: David Wasserman, Springfield; Charles Curtis Versfelt, Somerville, both of N.J.

[73] Assignee: Ethicon, Inc., Somerville, N.J.

[22] Filed: Nov. 22, 1971

[21] Appl. No.: 200,705

[52] U.S. Cl. .................... 260/78.3 R, 128/335.5
[51] Int. Cl. ........................... C08g 17/017
[58] Field of Search .................... 260/78.3

[56] References Cited
UNITED STATES PATENTS

| | | | |
|---|---|---|---|
| 2,890,208 | 6/1959 | Young et al. | 260/78.3 |
| 3,284,417 | 11/1966 | Hostettler et al. | 260/78.3 |
| 3,636,956 | 1/1972 | Schneider et al. | 128/335.5 |

FOREIGN PATENTS OR APPLICATIONS

| | | | |
|---|---|---|---|
| 69,212 | 10/1969 | Germany | |
| 988,939 | 4/1965 | Great Britain | |
| 2,026,220 | 9/1970 | France | |
| 755,447 | 8/1956 | Great Britain | 260/78.3 |

OTHER PUBLICATIONS

Chem. Abstracts 57, 8738d (1962).
Chem. Abstracts 74, 14267z (1971).

*Primary Examiner*—William H. Short
*Assistant Examiner*—E. A. Nielsen
*Attorney, Agent, or Firm*—Robert W. Kell

[57] ABSTRACT

High molecular weight copolymers of L(-) lactide and glycolide are prepared by heating a mixture of the monomers at 200°C. in the presence of a stannous octoate catalyst. The copolymers so obtained may be extruded to form filaments having utility as absorbable sutures.

5 Claims, 3 Drawing Figures

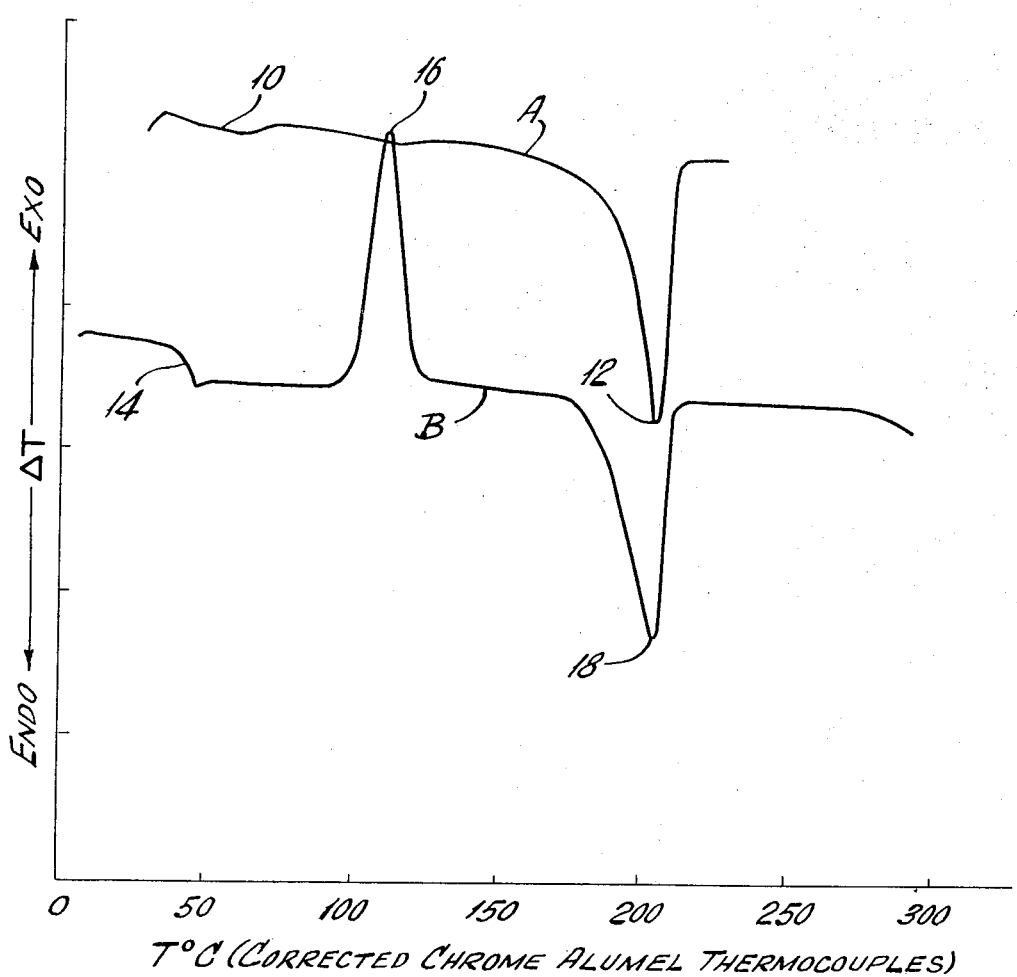

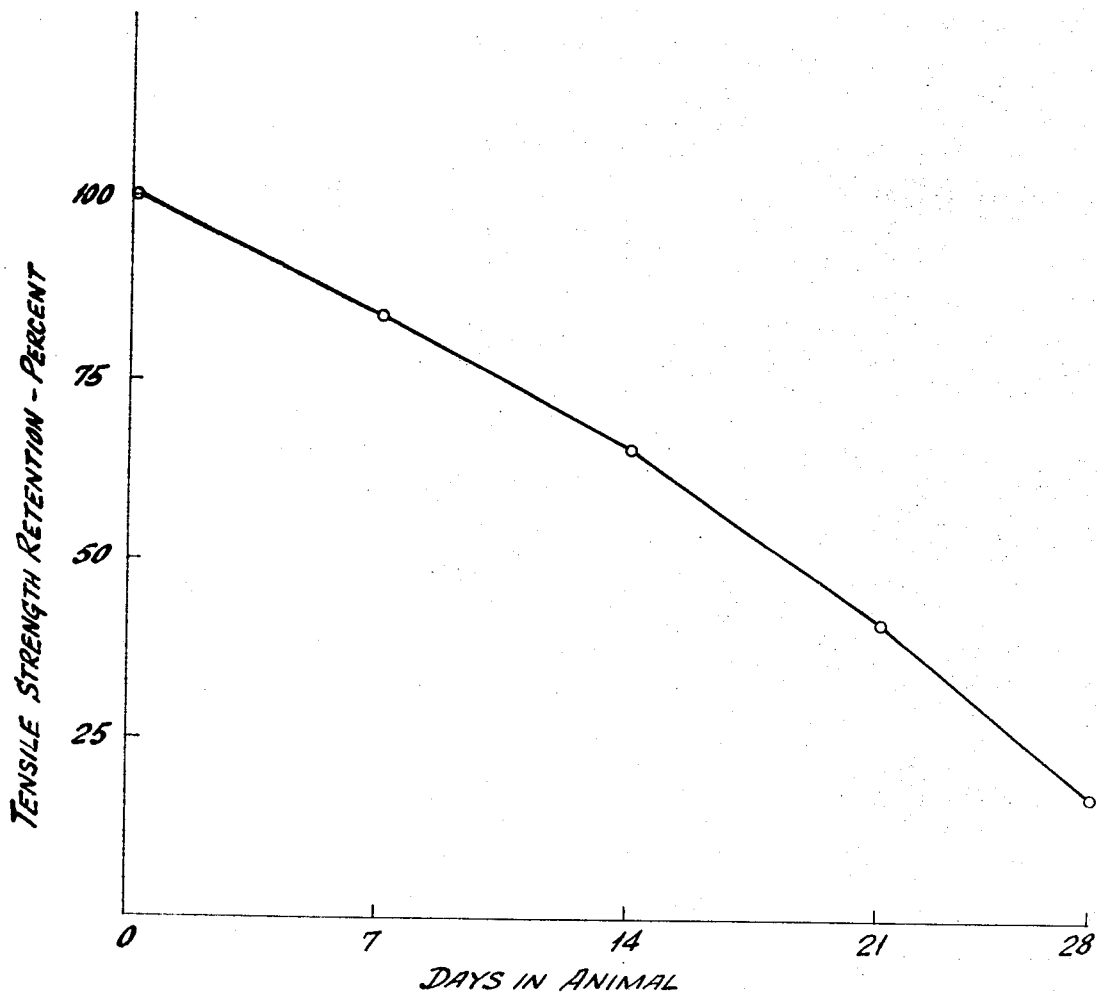

3,839,297

USE OF STANNOUS OCTOATE CATALYST IN THE MANUFACTURE OF L(-)LACTIDE-GLYCOLIDE COPOLYMER SUTURES

BACKGROUND OF THE INVENTION

This invention relates to improved absorbable surgical sutures and more particularly to poly [L(-) lactide-co-glycolide] sutures and a catalyst useful in the manufacture thereof.

High molecular weight polymers of glycolide and copolymers of glycolide with lactide are well known and are described in U.S. Pat. No. 2,668,162. Polymers of lactide and copolymers of lactide with glycolide are described in the U.S. Pat. No. 2,703,316. Optically active homopolymers of L(-) lactide are described in U.S. Pat. No. 2,758,987.

The use of polyglycolide homopolymers as absorbable sutures is described in U.S. Pat. No. 3,297,033. U.S. Pat. No. 3,636,956 describes the preparation of copolymers of L(-) lactide and glycolide having utility as absorbable sutures. The polymerization of lactides such as glycolide in the presence of stannous stearate and stannous acetate catalysts is described in East German Pat. No. 69,212.

Copolymers of glycolide with L(-) lactide offer many advantages over glycolide homopolymers in the manufacture of an absorbable suture. One disadvantage of glycolide homopolymer monofilaments is that they have a high Young's modulus and lack of flexibility that results in poor handling qualities. While the handling characteristics of a suture are difficult to define, a suture should not be wiry or stiff and should remain in the position in which it is placed until moved by the surgeon. To improve the handling characteristics of polyglycolide homopolymer sutures, the homopolymer is extruded as a fine multifilament and then braided to obtain the desired size and strength. The braiding process is an extra step, however, that adds to the ultimate cost of the suture and many surgeons prefer to use a monofilament suture over a braided suture because of concern that microoganisms may enter into the interstices of the braid and be carried along the suture tract thereby infecting the wound.

Another disadvantage of the homopolymer sutures described in U.S. Pat. No. 3,297,033 is that they are light in color and cannot readily be seen in the operating field by the surgeon.

Copolymers of glycolide with L(-) lactide do not have the above disadvantages of the glycolide homopolymer since they are compatible with plasticizers and when plasticized may be extruded as flexible monofilaments having excellent handling qualities that are acceptable to the surgeon. Another advantage of sutures derived from copolymers of L(-) lactide and glycolide is that they may be readily dyed by conventional dying processes to produce a colored suture that is highly visible under the conditions of use. However compositions having the high molecular weight and narrow molecular weight distribution that is desired for the manufacture of absorbable sutures is difficult to obtain using the conventional catalysts described in the prior art.

Stannous acetate and stannous stearate have limited solubility in lactide-glycolide mixtures, especially in mixtures where glycolide is the major component. Stannous acetate has limited solubility in hydrocarbon solvents. Stannous octoate has the advantage of being compatible in the undiluted form in all concentrations of lactide and glycolide. In addition, it is readily soluble in toluene so that high dilutions can be made when very small amounts of catalysts are to be used.

BRIEF DESCRIPTION OF THE DRAWINGS

This invention will appear more clearly from the following detailed description when taken in connection with the following drawings which show by way of example a preferred embodiment of the inventive idea.

In the drawings:

FIG. 2 is a thermogram of the braided copolymer suture illustrated in FIG. 1; and FIG. 3 is a graph that shows the loss of tensile strength that occurs when the braided copolymer suture referred to in FIGS. 1 and 2 is implanted in an animal.

SUMMARY OF THE INVENTION

Figure 1:
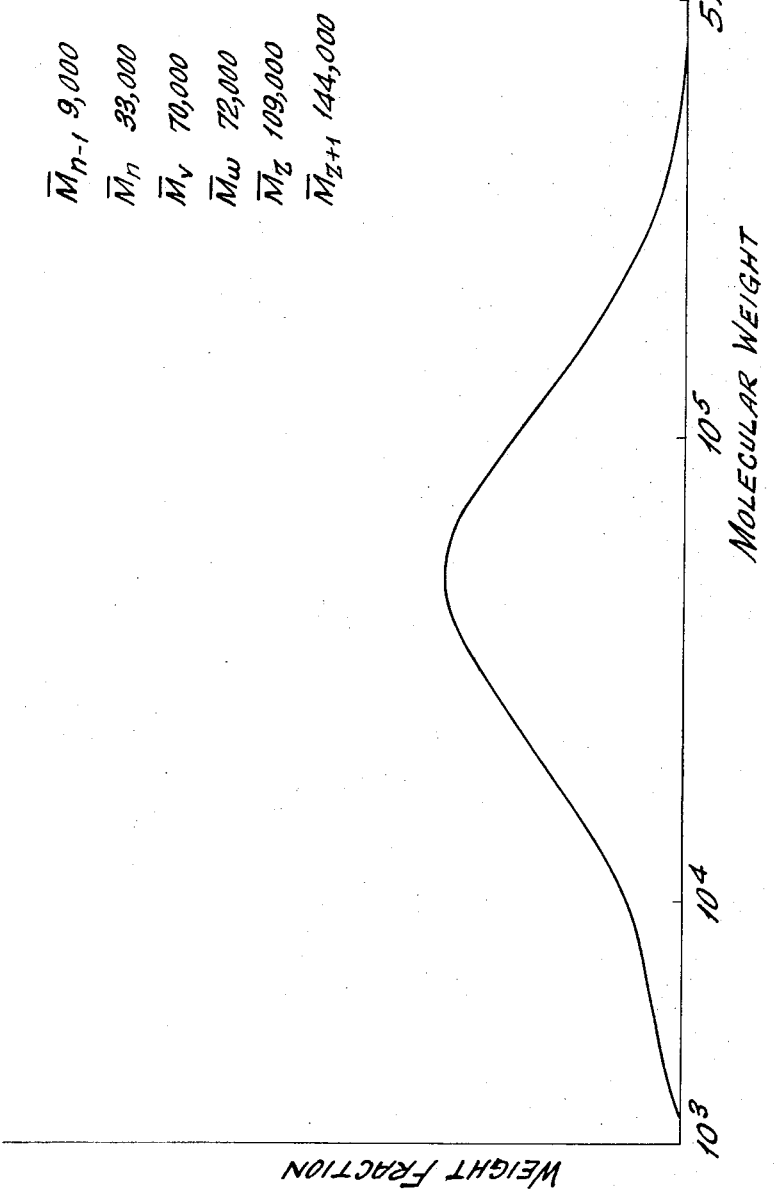
FIG. 1 is a curve showing the molecular weight distribution of a braided copolymer suture, made in accordance with the present invention.

From studying the reaction rates during the polymerization of mixtures of glycolide and L(-) lactide, it was noted that the rate of reaction of glycolide exceeded the reaction rate of L(-) lactide. Moreover, when an L(-) lactide unit has entered the growing chain, the rate at which glycolide reacted with the lactide end group was many times the rate at which another lactide unit would enter that growing chain. These differences in reaction rate tend to produce block polymers of glycolide.

It has now been discovered that stannous octoate is a preferred catalyst in the polymerization of mixtures of glycolide and L(-) lactide. While the present invention is not to be limited to any particular theory, it is believed that stannous octoate promotes the stereoregularity of the growing polylactide chain. Moreover, the molecular weight increases and the molecular weight distribution decreases when polymerization is carried out in the presence of a stannous octoate catalyst with the result that filaments extruded from the copolymer have an improved tensile strength which is retained for an extended period of time after implantation in an animal body.

DESCRIPTION OF THE PREFERRED EMBODIMENT

Poly [L(-) lactide-co-glycolide] compositions suitable for the manufacture of absorbable sutures are copolymers prepared by heating in the presence of stannous octoate catalyst at about 200°C. at least 65 mol per cent L(-) lactide and no more than 35 mol per cent glycolide. Absorbable sutures prepared from copolymers of glycolide and L(-) lactide using the catalyst of the present invention when the amount of L(-) lactide is in the range of 10 to 15 mol per cent, and the amount of glycolide is 85 to 90 mol per cent also offer advantages over glycolide homopolymer sutures.

Both the L(-) lactide and the glycolide used for the polymerization reaction should be pure and dry. The reaction is run in a dry container under a blanket of dry nitrogen. Stannous octoate is used to catalyze the polymerization. The ratio of monomer to catalyst (mol/mol) is desirably in the range of about 50,000–150,000:1. A minor quantity of glycolic acid may be present as a chain-stopping reagent to control the molecular weight. If glycolic acid is used, the ratio of monomer to glycolic acid may be in the range of 400:1 to 2,000:1. To effect polymerization, the mixture of L(-) lactide and glycolide is heated at a temperature of about 200°C. for about 5 hours until a sample of the polymer has an inherent viscosity of about 1.4 at 0.1 per cent concentration in hexafluoroisopropanol at 25°C.

If the copolymer is to be used in the manufacture of colored sutures, a dye (0.1 per cent to 0.5 per cent by weight D&C Violet No. 2) is added to the reaction flask prior to polymerization. D&C Violet No. 2 is 1-hydroxy-4-p-toluinoanthraquinone. This dye is uniformly dispersed throughout the monomer mixture and has little adverse effect on the polymerization reaction. Following the polymerization reaction, the dyed polymer composition may be extruded into air to form a multifilament and the multifilament drawn and annealed prior to braiding. After the braiding step, the braided multifilament is again stretched and annealed prior to sterilization.

If the copolymer is to be used in the manufacture of plasticized monofilament sutures, a plasticizer (as much as 20 per cent by weight bis 2-methoxyethylphthalate) may be incorporated with a lactide-glycolide copolymer prior to extrusion. The plasticized monofilaments extruded from such plasticized copolymer compositions have an excellent hand and a straight tensile strength of about 70,000 p.s.i.

The present invention will be further illustrated by the following examples which describe the copolymerization of L(-) lactide and glycolide in the presence of stannous octoate catalyst.

Throughout the specification and examples which follow, all quantities are expressed in parts by weight unless otherwise indicated.

Example 1

Preparation of a 10/90 Poly L(-) lactide/Coglycolide (1078-21B)

A 1-liter stainless-steel reactor vessel equipped with a stirrer paddle, stirrer motor, and gas outlet is heated to 110°C. under vacuum to remove moisture from the interior surfaces of the vessel.

A mixture of 80.6 g. (0.56 moles) of pure L(-) lactide m.p. 97°–99°C. (specific rotation at least 282°) and 580 g. (5.0 moles) of pure glycolide m.p. 82.5°–84.25°C. is prepared using dry glassware in a dry nitrogen glove box. This mixture of 10 mol per cent L(-) lactide and 90 mol per cent glycolide is transferred to the vessel under a blanket of dry nitrogen. To this reaction mixture is added 0.34 ml. of a 0.33 molar catalyst solution containing 13.41 g. of stannous octoate in 100 ml. of toluene ($1.11 \times 10^{-4}$ moles) using a dry glass syringe. The molar ratio of monomer to catalyst is 50,000:1. Then 0.5283 g. ($6.95 \times 10^{-3}$ moles) of glycolic acid is added. The molar ratio of monomer to glycolic acid is 800:1.

The reaction vessel is closed and a high vacuum (0.1–0.2 mm. of mercury pressure) is applied to remove the toluene. The vessel is purged with dry nitrogen by evacuating and releasing the vacuum twice with the gas. The vessel is then again filled with dry nitrogen until the pressure within the vessel is about one pound above atmospheric pressure and the outlet valve is closed.

The vessel and its contents are lowered into a silicone bath, pre-heated to a temperature of 200°C. and heated with stirring at that temperature for one hour. The stirrer is raised above the liquid and the heating at 200°C. is continued for four hours longer. The unit is cooled and the polymer mass is removed from the opened unit. This is chilled with dry ice, cut in quarters with a hand saw, ground with dry ice in a Cumberland Mill and dried in vacuo for 72 hours at 0.1 mm. and 25°C. The yield of copolymer obtained (Polymer 1078-21B) is 545.9 g. (82.9 per cent). This product has a tack point of 210°C.; a draw point of 214°C.; and a melting point (flow point) of 234°C. The inherent viscosity of this copolymer at 0.1 per cent concentration in hexafluoroisopropanol at 25°C. is 1.54.

The melt index of an aliquot sample of this product is determined by a procedure similar to ASTM Method D 1238-65T published by the American Society for Testing Materials, 1916 Race Street, Philadelphia, Pennsylvania 19103; using an extrusion plastometer (melt indexer) manufactured by Tinius Olsen Testing Machine Co., Easton Road, Willow Grove, Pennsylvania 19090. The melt index at 235°C. using a 3,800 g. weight and a 25 mil. orifice is 0.36 (grams/10 minutes at 90 seconds).

Example 2

Extrusion of a 10/90 Poly[L(-) Lactide-Co-Glycolide] (1038-153)

The polymer (1078-21-B2) described in Example 1 above is extruded under dry nitrogen using a screw extruder to produce an eight-strand multifilament. A filter of sand, classified to pass a No. 40 screen and be retained on a No. 60 screen is supported on a No. 80 screen (U.S. Standard), placed between the metering pump of the extruder and the die. The die used has eight orifices 25 mils. in diameter.

The screw of the extruder is operated to maintain a pressure of 2,000 p.s.i., and the metering pump of the extruder is operated to maintain a pressure at the die of 150–100 p.s.i. Throughout the extrusion, the screw feed section of the extruder is maintained at 245°C.; the temperature of the metering pump is 210°C. and the die temperature is maintained at 215°C. The eight-strand multifilament is collected on the take-up spool at the rate of 70 feet per minute.

The multifilament so obtained is oriented by stretching over a godet heated at 135°F.; 4.5x. The oriented multifilament is next annealed by placing the spool with the multifilament in place thereon in an oven heated to 105°C. for 45 minutes. The tensile strength of the multifilament (54.8 denier) following this annealing step is 4.8 grams per denier.

Example 3

Braiding a 10/90 Poly [L(-) Lactide-Co-Glycolide] Yarn (P-331)

The eight-strand yarn (54.8 denier) is placed on braider bobbins on a 16-carrier machine with a three-ply core. The braid is made with 51 ± picks per inch to produce a size 2/0 braided multifilament suture (average diameter 13.6 mils.), having a tensile strength of 13.8 lbs. (95,000 p.s.i.), and a knot strength of 8.5 lbs. (58,500 p.s.i.). The braided multifilament is hot stretched by winding on a rack which is placed in an oven heated slightly above room temperature and extended 10 per cent to produce in the brain a 1.1 $x$ stretch. The rack with the stretched braid still in place is then annealed in the oven in an inert atmosphere for 24 hours at 105°C. Apparatus useful for stretching and annealing the copolymer braid is described and illustrated in U.S. Application Ser. No. 846,412, filed July 31, 1961.

Example 4

Sterilization and Packaging of 10/90 Poly [L(-) Lactide-C.-Glycolide] Sutures (1095-39A)

The stretched and annealed multifilament braid described in the preceding Example 3 is cut into lengths suitable for suture use and sterilized with ethylene oxide in open vent packages by exposing the braided sutures to an atmosphere containing ethylene oxide in the amount of 1,000 mgm. per liter at a relative humidity of 100 per cent for 3 hours at 25°C. The sterilization procedure is repeated by exposing the product under the same conditions for another three hours at 25°C. The packages are then de-gassed under vacuum (0.5 mm. of mercury) for 16 hours at 40°C.; and sealed. The sterile packaged sutures (diameter 13.2 mils.) have a knot strength of 8.10 lbs. (59,100 p.s.i.) when tested on a SCOTT Model No. IP-4 Incline Plane Tester by the method described in the *United States Pharmacopoeia* Vol. XVII at Page 921. The straight tensile strength of the sterile suture (diameter 13.2 mils.) determined on the SCOTT Incline Plane Tester is 12.8 lbs. (93,600 p.s.i.).

The absorption characteristics of this product (tensile strength retention in rats at the end of 7, 14, 21, and 28 days) is determined by implanting ten samples in five different animals. The average of ten breaks using an INSTRON Testing Machine operating at a cross-head speed of 1 inch per minute and a 0.5-inch jaw separation is tabulated below and illustrated in FIG. 3.

|  | Days Implantation | | | | |
| --- | --- | --- | --- | --- | --- |
|  | 0 | 7 | 14 | 21 | 28 |
| Straight Tensile Strength in Pounds | 12.69 | 10.70 | 8.26 | 5.32 | 2.17 |
| Percent Tensile Strength Retention | 100 | 84.32 | 65.09 | 41.88 | 17.06 |

A representative sample of the braided suture was examined by gel permeation chromatography to obtain information on the molecular weight and molecular weight distribution of the copolymer. FIG. 1 is a graphic representation of the chain length distribution data so obtained. It will be noted that the ratio of weight-average molecular weight to number average molecular weight is 72,000:33,000 or about 2.1. A representative sample of the sterile braided suture of this example was evaluated utilizing a differential scanning calorimeter (DuPont Instruments Model No. 500). The thermograms are reproduced in FIG. 2. It will be noted from Graph A that the glass transition temperature of the annealed and braided suture is indicated by the numeral 10 and is about 55°C. The melting point, indicated by the numeral 12, is about 205°C. The copolymer suture, after melting, is quenched and a second thermogram (Curve B) obtained. On this quenched material the glass transition temperature is indicated by the numeral 14 and occurs at about 43°C. The crystallization temperature is indicated by the numeral 16 and occurs at about 112°C. The melting point is indicated by the numeral 18 and occurs at about 205°C.

Example 5

Preparation of a 10/90 Poly [L(-) Lactide-Co-Glycolide] Containing 0.1 Weight Percent D&C Violet No. 2 (1023-74)

A 1-liter stainless-steel reactor vessel equipped with a stirrer paddle, stirrer motor, and gas outlet is heated to 110°C. under vacuum to remove moisture from the interior surfaces of the vessel.

A mixture of 80.6 g. (0.56 moles) of pure L(-) lactide m.p. 97°–99°C. (specific rotation at least 282°C.) and 580 g. (5.0 moles) of pure glycolide m.p. 82.5°–84.5°C. is prepared using dry glassware in a dry nitrogen glove box. This mixture of 10 mol per cent L(-) lactide and 90 mol per cent glycolide is transferred to the reactor vessel under a blanket of nitrogen. To this reaction mixture is added 0.34 ml. of a 0.33 molar catalyst solution containing 13.41 g. of stannous octoate in 100 ml. of toluene (1.11 × 10$^{-4}$ moles) using a dry glass syringe. The molar ratio of monomer to catalyst is 50,000:1. Then 0.5283 g. (6.95 × 10$^{-3}$ moles) of glycolic acid and 0.6611 g. (0.1 weight percent) of D&C Violet No. 2 are added. The molar ratio of monomer to glycolic acid is 800:1.

The reactor vessel is closed and a high vacuum (0.1–0.2 mm. of mercury pressure) is applied to remove the toluene. The vessel is purged with dry nitrogen by evacuating and releasing the vacuum twice with the gas. The vessel is then again filled with dry nitrogen until the pressure within the vessel is about one pound above atmospheric pressure and the outlet valve is closed.

The vessel and its contents are lowered into a silicone bath, pre-heated to a temperature of 200°C. and heated with stirring at that temperature for one hour and two minutes. The stirrer is raised above the liquid and the heating at 200°C. is continued for four hours and eighteen minutes longer. The unit is cooled and the polymer mass is removed from the opened unit. This is chilled with dry ice, cut in quarters with a hand saw, ground with dry ice in a Cumberland Mill and dried in vacuo for 48 hours at 0.1 mm. and 25°C. The yield of copolymer obtained (Product 1023-86) is 620 g. The copolymer so obtained has a hardness of 92–94; a transition temperature (softens) in the range of 196°–199°C.; a tack point of 200°–202°C.; a draw point of 206°–207°C.; and a melting point (flow) of 217°C. The inherent viscosity of this copolymer at 0.1 per cent concentration in hexafluoroisopropanol at 25°C. is 1.43.

The polymerization reaction described above in this example is repeated four times (heating at 200°C. for about 1 hour with stirring and an additional 4 hours without stirring) with the following results:

Product 1023-76

| | |
|---|---|
| Yield | 618 g. |
| Hardness | 92–94 |
| Softening Point | 195–198°C. |
| Tack Point | 199–200°C. |
| Draw Point | 206°C. |
| Melting Point | 217–219°C. |
| Inherent Viscosity | 1.35 |

Product 1023-79

| | |
|---|---|
| Yield | 615 g. |
| Hardness | 92–94 |
| Softening Point | 195–198°C. |
| Tack Point | 199–210°C. |
| Draw Point | 205–206°C. |
| Melting Point | 217–219°C. |
| Inherent Viscosity | 1.46 |

Product 1023-81

| | |
|---|---|
| Yield | 621 g. |
| Hardness | 92–94 |
| Softening Point | 195–198°C. |
| Tack Point | 200°C. |
| Draw Point | 206–207°C. |
| Melting Point | 215–218°C. |
| Inherent Viscosity | 1.37 |

Product 1023-83

| | |
|---|---|
| Yield | 621 g. |
| Hardness | 92–94 |
| Softening Point | 195–198°C. |
| Tack Point | 200°C. |
| Draw Point | 205–206°C. |
| Melting Point | 215–216°C. |
| Inherent Viscosity | 1.29. |

The five products identified above (1023-74, 76, 79, 81, and 83) are ground in a Cumberland Mill with dry ice to pass through a three-sixteenth-inch screen. The blend (1023-85) is demetallized with a magnet and dried thoroughly in a vacuum oven. The combined product weighs 2,879 grams and has the following physical characteristics:

| | |
|---|---|
| Softening Point | 190–197°C. |
| Tack Point | 200–202°C. |
| Draw Point | 205–206°C. |
| Melting Point | 217–218°C. |
| Inherent Viscosity | 1.41. |

The melt index of an aliquot sample of the combined products as determined by the method described in Example 1 above is 1.2.

Example 6

Extrusion of a 10/90 Poly [L(-) Lactide-Co-Glycolide] Containing 0.1 Weight Percent D&C Violet No. 2 (1038-49, 55; 2661-130957-61)

The polymer blend (1023-85) described in Example 5 is extruded as described in Example 2 to produce an eight-strand multifilament.

The screw of the extruder is operated to maintain a pressure of 1,500 p.s.i. and the metering pump is operated to maintain a pressure at the die of 200–2,750 p.s.i., the rate of extrusion being 30 grams per hour.

Throughout the extrusion, the screw feed section of the extruder is maintained at 245°± 2°C.; the temperature of the metering pump is 202°–207°C.; and the die temperature is maintained at 203°–211°C. The eight-strand multifilament is collected on the take-up spool at the rate of 70 feet per minute.

The multifilament so obtained is oriented by stretching 3.5x over a godet heated to 125°F. The oriented multifilament is next annealed by placing the spool with the multifilament in place thereon in an oven heated to 235°F. for 20 minutes. The denier of the multifilament following this annealing step is 56 ± 4 and the tensile strength is 5.2 ± 0.8 grams per denier.

Example 7

Braiding a 10/90 Poly [L(-) Lactide-Co-Glycolide] Yarn Containing 0.1 Weight Percent D&C Violet No. 2 (P-239A - 1045 p. 96, 96A)

The eight-strand yarn (total yarn denier 56 ± 4) is placed on braider bobbins on a sixteen-carrier machine with a three-ply core. The braid is made with 51 ± 3 picks per inch to produce 350 yards of a size 2/0 braided multifilament suture. The braided multifilament suture (average diameter 13.7 mils.) has a tensile strength of 10.4 lbs. (70,500 p.s.i.) and a knot strength (average diameter 13.5 mils.) of 6.9 lbs. (48,200 p.s.i.).

The braided multifilament is stretched by winding on a rack which is then extended 20 per cent to produce in the braid a 1.2x stretch. The rack with the stretched braid still in place is then annealed in an oven for 24 hours at 105°C. The braid after annealing (diameter 12.5 mils.) has a straight tensile strength of 10.3 lbs. (84,000 p.s.i.) and a dry knot strength (diameter 12.2 mils.) of 6.21 lbs. (53,100 p.s.i.).

Example 8

Sterilization and Packaging of 10/90 Poly [L(-) Lactide-Co-Glycolide] Sutures Containing 0.1 Weight Percent D&C Violet No. 2 (1045-132, 134A; 1039-99)

The stretched and annealed multifilament braid described in the preceding Example 7 is cut into lengths suitable for suture use and sterilized with ethylene oxide in open vent packages, by exposing the braided sutures to an atmosphere of FREON and ethylene oxide (500 mg. of ethylene oxide per liter of gas) at 70 per cent relative humidity and 38°C. for 6 hours.

The packages of sterilized braided sutures are sealed to maintain sterility until use. The sterile packaged sutures have a straight tensile strength of 10.00 lbs. and a dry knot strength of 6.54 lbs.

The absorption characteristics of this product (tensile strength retention in rats at the end of 5 days) is determined by implanting 10 samples in five different animals. In like manner, the tensile strength retention is determined 10, 15, and 21 days post implantation. The average of 10 breaks using an INSTRON Testing Machine operating at a cross-head speed of 1 inch per minute on an 0.5-inch sample is tabulated below.

| | Days Implantation | | | | |
|---|---|---|---|---|---|
| | 0 | 5 | 10 | 15 | 21 |
| Straight Tensile Strength in Pounds | 10.00 | 8.8 | 7.5 | 5.5* | 2.97 |
| Percent Tensile Strength Retention | 100 | 88. | 75. | 55. | 29.7 |

*Average of 9 breaks.

Example 9
Preparation of a 65/35 Poly [L(-) Lactide-Co-Glycolide]

A round-bottomed PYREX flask having a long neck is carefully cleaned, flame dried, evacuated and purged two times with dry nitrogen. To the flask is added under a dry nitrogen atmosphere:

|  | (m.p.) | wt. % |
|---|---|---|
| 231.42 parts glycolide | (82.8–84.5°C.) | 30.19 |
| 533.52 parts L(-) lactide | (98°–99°C.) | 69.61 |
| 1.558 parts stannous octoate |  | 0.20 |

The flask is evacuated to 125 mm. pressure and heated at 105°C. for 66 hours. The polymer so obtained (inherent viscosity in 0.1 per cent chloroform solution = 3.2–3.4) is dissolved in dry 1, 1,2-trichloroethane (distilled from phosphorous pentoxide) to give a clear 8 per cent (W/W) solution (bulk viscosity 1,600 poise).

The spin dope (8 per cent solution) is heated to 90°C. and extruded through a 10-hole 0.005-inch spinneret (capillary land/diameter = 2.4) at a rate of 3 milliliters per minute into a heated column 15 feet long and 6 inches in diameter. The temperature within the heated column varried from 128°C. at the bottom to 143°C. at the top and the column is swept with hot nitrogen (131°–134°C.) at a rate of 5 cubic feet per minute. The extruded filaments are taken up on a reel at a linear speed of 150 feet per minute. The inherent viscosity of the filamentary material is 3.4 indicating no degradation during the spinning process. The copolymer filament is lustrous in appearance and has the following physical characteristics:

| Tensile Strength | 1.0 grams/denier |
|---|---|
| Elongation | 530 per cent |
| Young's Modulus | 24 grams/denier. |

The filament contains about 1.5 per cent residual solvent.

The yarn from the take-up spool is six-plied to 60 filaments and drawn 4.5 times at 75°C. and 25 feet per minute input speed through a tubular furnace swept with nitrogen. The drawn yarns prepared as described above have the following physical characteristics:

| Tensile Strength | 2.8–3.3 grams/denier |
|---|---|
| Elongation | 26 per cent |
| Young's Modulus | 50 grams/denier. |

The individual filaments have a tensile strength of about 4.8–5.0 grams/denier; an elongation of about 38 per cent and a Young's Modulus of about 45 grams per denier. The yarn is braided to form a Size 2/0 braided suture, packaged in a dry atmosphere in a hermetically-sealed container and sterilized by Cobalt 60 gamma irradiation. The in vivo absorption characteristics of this braided suture material in rats are indicated below.

|  | Days Post Implantation | | | | |
|---|---|---|---|---|---|
|  | 0 | 1 | 5 | 10 | 15 |
| Tensile Strength ($\times 10^3$ p.s.i.) | 36 | 47 | 37 | 32 | 30 |

-Continued

|  | Days Post Implantation | | | | |
|---|---|---|---|---|---|
|  | 0 | 1 | 5 | 10 | 15 |
| Percent Retention |  | 100 | 79 | 68 | 63 |

While the invention has been described merely by way of example, many modifications thereof may be made without departing from its spirit. It will be understood, therefore, that the invention is to be limited only by the prior art, and the scope of the appended claims.

What is claimed is:

1. In polymerization of a mixture of L(-) lactide and glycolide to form a poly [L(-) lactide-co-glycolide] of high molecular weight suitable for extrusion to form filaments having utility as absorbable sutures, the improvement which comprises heating the monomer mixture under anhydrous conditions in the presence of a stannous octoate catalyst.

2. The process of claim 1 wherein the molar ratio of monomer to catalyst is 50,000:1.

3. The process of claim 1 wherein the molar ratio of monomer to catalyst is 1,500:1.

4. The process of claim 1 wherein a small amount of glycolic acid is added to the reacting monomers.

5. The process of claim 1 wherein the monomer mixture is heated at a temperature of about 200°C.

* * * * *

UNITED STATES PATENT OFFICE
CERTIFICATE OF CORRECTION

Patent No. 3,839,297    Dated October 1, 1974

Inventor(s) David Wasserman and Charles Curtis Versfelt

It is certified that error appears in the above-identified patent and that said Letters Patent are hereby corrected as shown below:

Title should read --- Use of Stannous Octoate Catalyst in the Manufacture of Poly L(-)Lactide/Coglycolide Sutures ---.

Under Other Publications, Chem.Abstracts 74, delete the "z" after 14267.

In Column 2, line 57, "10" should not be in superior letters.

In Column 4, line 26, "90 seconds" should read --- 900 seconds ---.

In Column 5, line 1, "brain" should read --- braid ---.

In Column 5, line 11, "-C" should read ---  -Co  ---.

In Column 6, line 12, "10" should not be in superior letters.

In Column 7, in Table, line 12, "199-210°C." should read --- 199-201°C. ---.

In Column 9, line 12, "1.558" should read --- 1.5558 ---.

Signed and sealed this 3rd day of December 1974.

(SEAL)
Attest:

McCOY M. GIBSON JR.
Attesting Officer

C. MARSHALL DANN
Commissioner of Patents